United States Patent [19]
McAfee et al.

[11] Patent Number: 5,417,074
[45] Date of Patent: May 23, 1995

[54] LIQUID NITROGEN IMMERSION/IMPINGEMENT FREEZING METHOD AND APPARATUS

[75] Inventors: Kevin S. McAfee, Alburtis; Roger A. Howells, Orefield, both of Pa.; Edward F. Kiczek, Long Valley, N.J.; Russell I. Snyder, III, Allentown; Earl W. Moore, Macungie, both of Pa.

[73] Assignee: Air Products and Chemicals, Inc., Allentown, Pa.

[21] Appl. No.: 101,625

[22] Filed: Jul. 26, 1993

[51] Int. Cl.⁶ .............................................. F25D 13/06
[52] U.S. Cl. .............................................. 62/63; 62/374
[58] Field of Search .................... 62/63, 374, 375

[56] References Cited

U.S. PATENT DOCUMENTS

| | | | |
|---|---|---|---|
| 3,255,608 | 6/1966 | Macintosh | 62/374 |
| 3,302,423 | 2/1967 | Morrison | 62/374 |
| 3,368,363 | 2/1968 | Alaburda et al. | 62/374 |
| 3,485,055 | 12/1969 | Webster et al. | 62/63 |
| 3,768,272 | 10/1973 | Barrett | 62/374 |
| 4,403,479 | 9/1983 | Rasovich | 62/374 |
| 4,955,209 | 9/1990 | Smith | 62/380 |

*Primary Examiner*—Ronald C. Capossela
*Attorney, Agent, or Firm*—Willard Jones, II

[57] ABSTRACT

Method and apparatus for rapidly crust or through freezing a particle by simultaneously moving the particle through a bath of cryogenic liquid and exposing the particle or portions of the particle not submerged in the liquid to a spray of the cryogenic liquid.

13 Claims, 5 Drawing Sheets

LIQUID NITROGEN IMMERSION/IMPINGEMENT FREEZING METHOD AND APPARATUS

FIELD OF THE INVENTION

The present invention pertains to liquid immersion freezing systems.

BACKGROUND OF THE INVENTION

Liquid immersion freezing systems such as shown and described in U.S. Pat. No. 4,955,209 have been used to quick freeze various types of food and non-food products by direct immersion of a foodstuff or other particulate product into a bath of a cryogenic liquid, e.g. liquid nitrogen, to effect quick freezing of the foodstuff or particulate product. In addition to being exposed to contact with the cryogenic liquid, the particles are also contacted with vaporized cryogenic liquid above the bath.

One of the drawbacks with the prior art immersion-type freezers is that particles of small size and/or low density tend to float in the bath of liquid cryogen as they proceed from one end to the other of the freezing apparatus. Thus, the portion of the foodstuff or particle in direct contact with the liquid may be quick frozen, but the other part of the particle that is not in direct contact with the liquid may not achieve the desired temperature or desired degree of freezing.

Immersion-type freezers are proposed to be used in combination with conventional-type mechanical (non-cryogenic) freezers to provide an initial quick freeze, through freezing being accomplished in a separate freezer that is used in tandem with the immersion-type freezer.

SUMMARY OF THE INVENTION

In order to avoid the problems of the prior art immersion-type freezers, it has been discovered that the same cryogenic liquid used in the bath can be sprayed on the particles as they proceed through the freezer so that the portion of the particles not in direct contact with the cryogenic liquid are contacted by additional cryogenic liquid to achieve a uniform overall crust freezing. Under proper operating conditions, the particles can be through frozen according to the method and apparatus of the present invention.

DETAILED DESCRIPTION OF THE INVENTION

Figure 1:
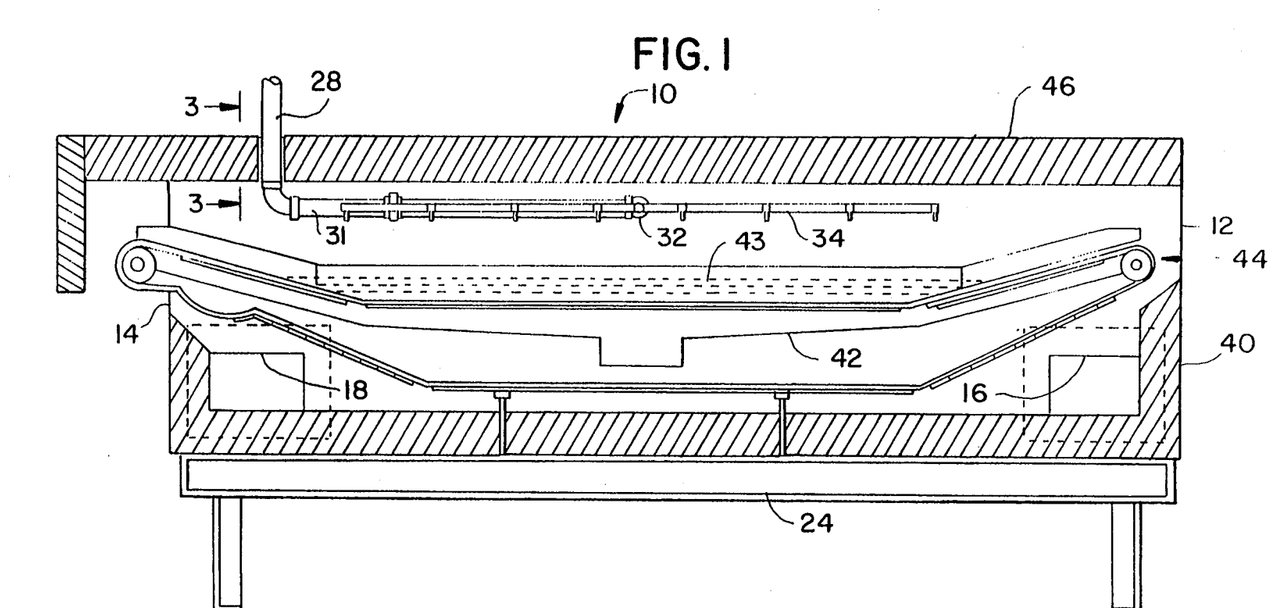
FIG. 1 is an elevational view in section of the apparatus taken along line 1—1 of FIG. 2, with portions eliminated.
Figure 2:
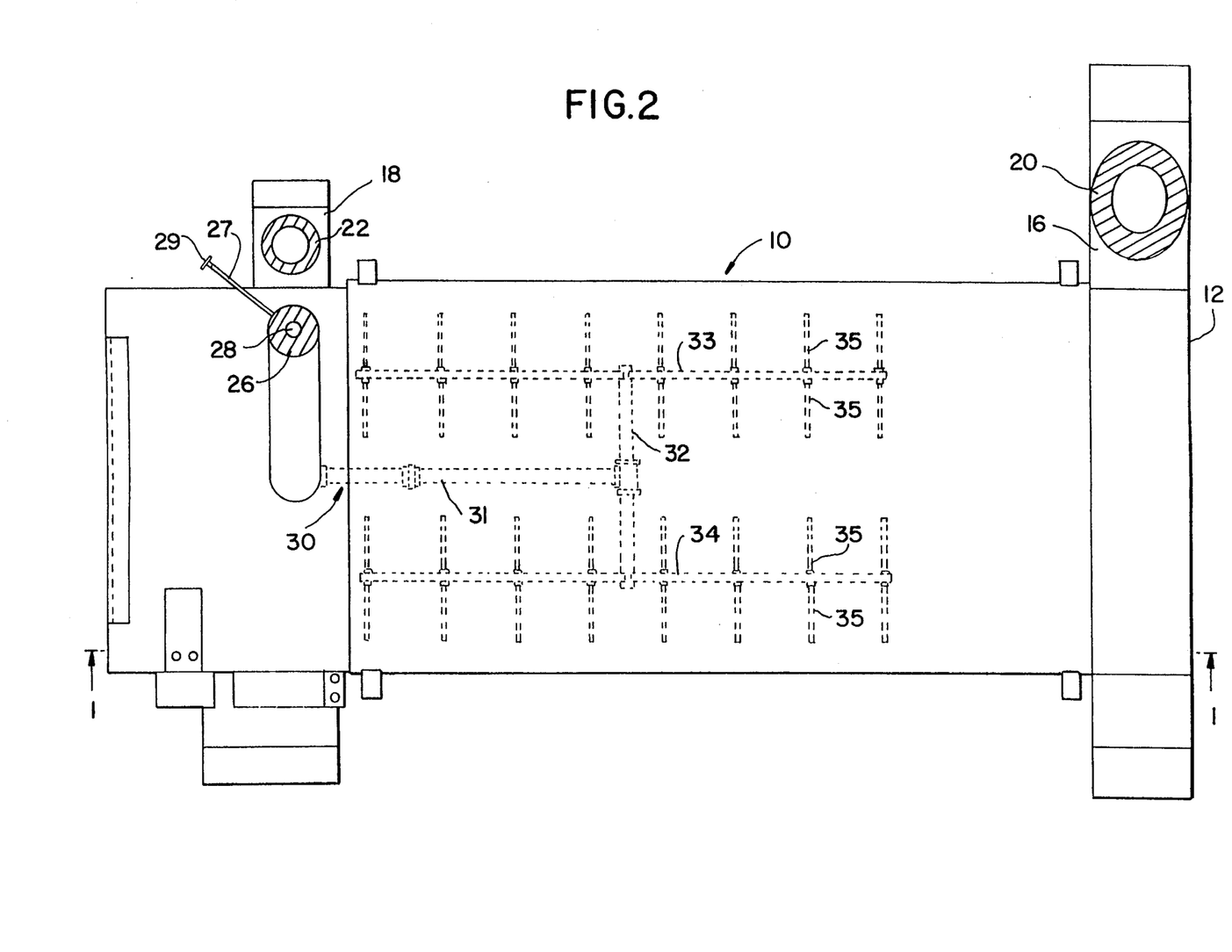
FIG. 2 is a top plan view of an apparatus according to the present invention.
Figure 3:
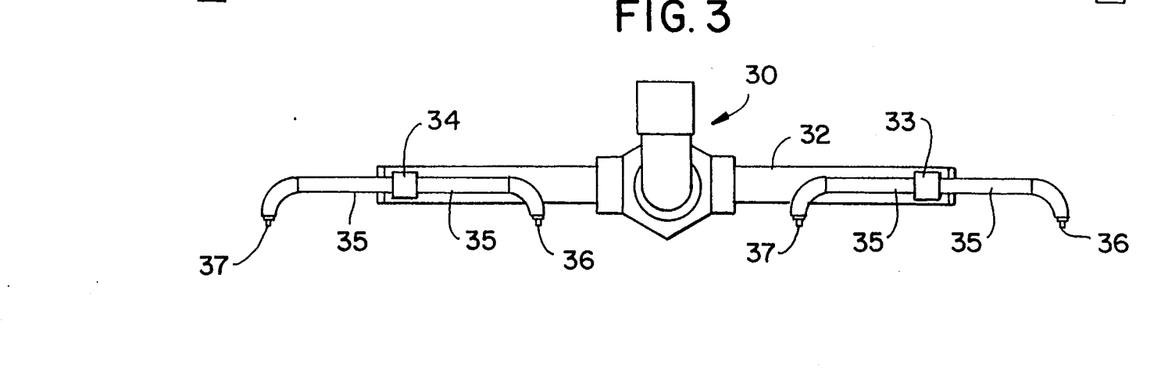
FIG. 3 is a section showing a portion of the spray apparatus for the freezer of the invention taken along line 3—3 of FIG. 1.

Referring to the drawing, in FIGS. 1 and 2, the immersion freezer according to the invention is shown generally as 10.

Freezer 10 includes an entry end 12 and a discharge end 14, the entry and discharge ends containing exhaust collection devices 16, 18, communicating with exhaust stacks 20, 22, which are used to remove vaporized cryogen from the processing area. In those instances where liquid nitrogen is the cryogen, it is well known that nitrogen can act as a suffocant by displacing oxygen from the room air in which the freezer is being used and thus it is critical to prevent vaporizing cryogen from entering the processing room atmosphere. The freezer 10 can be supported on a table-like structure 24 as is well known in the art. Freezer 10 includes means for introducing a spray of cryogenic liquid (e.g., liquid nitrogen) into the freezer as will be hereinafter more fully explained, the means including an insulated conduit 26 surrounding a liquid nitrogen delivery conduit 28 connected to a source of liquid nitrogen (not shown). Liquid nitrogen conduit 28 includes an automatic control valve (not shown) and a manual control valve (not shown) activated by shaft 27 and wheel 29 communicating with a spray header apparatus 30 containing branch conduits 31, 32 connected to manifolds 33, 34 which in turn are connected to spray arms 35 each of which has two spray nozzles or heads 36, 37 to introduce a spray of cryogenic liquid into the freezer 10 as will hereinafter be more fully explained.

Referring to FIG. 1, the freezer 10 includes a housing 40 which is generally a metal structure insulated to prevent excessive loss of cryogen. Contained within the housing 40 is a pan-like structure 42 which will receive and hold a supply of liquid cryogen in the form of a bath 43 at a specific level. An endless conveyor 44 is disposed within the housing 40 a major portion of which runs through the bath to conduct particles from the entry end 12 to the discharge end 14 of the freezer 10. The particles can be placed on the conveyor 44 by an auxiliary conveyor or shelf (not shown) as is well known in the art. The conveyor 44 is pitched on both ends to permit the particles to be precooled and post-cooled by vaporizing cryogen inside of the housing 40. Freezer 10 includes a top structure 46 to confine the vaporizing cryogen and direct it toward the entry and discharge ends for removal from the freezer 10 by collection devices 16, 18. Conduit 28 delivers cryogenic liquid (e.g. liquid nitrogen) via branch conduits 31, 32, headers or manifolds 33, 34 spray arms 35 to spray heads 36, 37 disposed above the bath and the conveyor 44. The cryogenic liquid introduced through spray heads 36, 37 serves two purposes: (1) the major purpose is to contact those portions of the particles being frozen that are above the surface of the liquid and; (2) to maintain the level of the cryogenic liquid in the bath contained in pan 42.

A food particle entering the freezer 10 is first exposed to vaporizing cryogen moving toward the entry end 12, then it is exposed to the liquid by both immersion and spray contact and then as it exits the freezer 10 is exposed to vaporizing cryogen moving toward the exit end 14 of freezer 10 to prevent unnecessary warming of the product. The freezer 10 according to the present invention thus has both co-current and counter-current gas flow to precool and postcool the particles being cooled. Vaporizing cryogen also maintains the total refrigeration capacity of the freezer 10 and is enhanced by the excess cryogenic liquid introduced through the conduit 28 as it vaporizes inside of the freezer 10.

In many food processing plants across the United States, conventional mechanical freezers are used to freeze food products for sale to the consumer. One of the problems with conventional mechanical freezers is that the slower freezing process leads to excessive dehydration of the product. The product dehydration not only causes significant weight loss for the processor, but leads to ultimate degradation of the quality of the food.

In attempting to improve yields, immersion-type freezers have been used in combination with mechanical freezers to provide a quick freezing or encapsulation of the product and therefore decrease the yield losses. Until the advent of the present method and apparatus, this has been less than successful since the immersion freezers do not entirely solve the dehydration problem because of food particles that tend to float on the surface of the cryogen.

A freezer according to the present invention was used to conduct certain trials in a plant freezing chicken parts wherein a conventional mechanical freezing system was used. Tests of identical particles showed that where the mechanical freezer only was used, there was an average yield loss of 2.36% from entry to discharge end of the mechanical freezer. When the freezer of the present invention was used to prefreeze or crust freeze the particles, the yield loss went down to an average of 1.27%, a significant decrease.

A similar series of tests were run on chicken patties as they exited the oven. When the patties were frozen using a mechanical freezer, the average product weight loss was 4.9%. When the apparatus of the present invention was used in combination with the same freezer, the average product weight loss was reduced to 2.2%.

Figure 4:
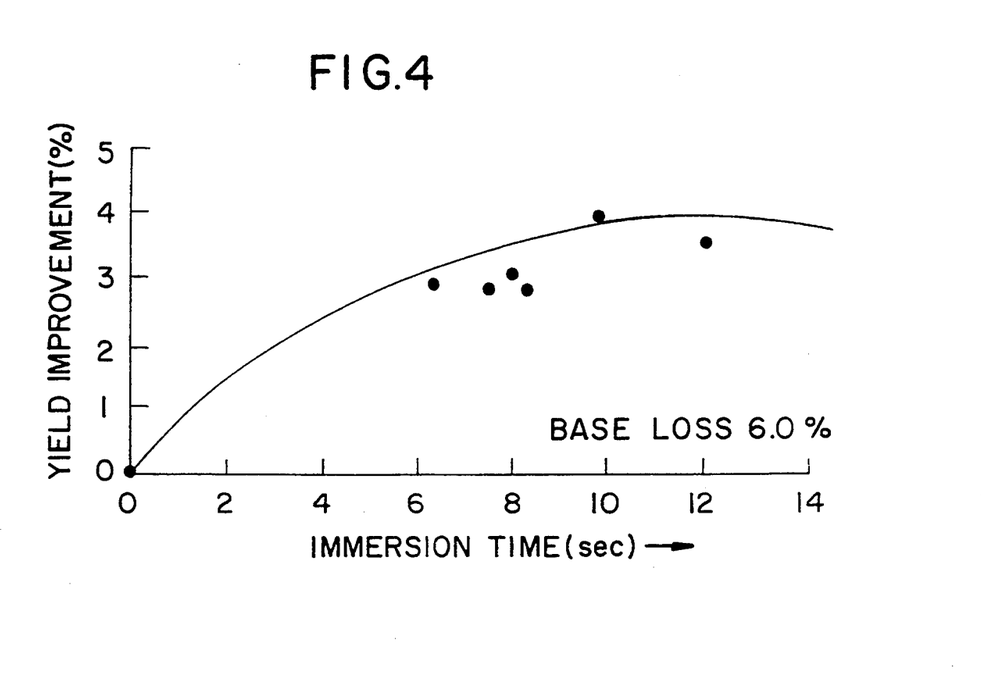
FIG. 4, is a plot of immersion time against yield improvement for hot chicken products processed according to the present invention.

As shown in FIG. 4 where the base loss was 6% for hot chicken products frozen in a mechanical freezer, however, the average yield increase went up to a high slightly better than 4% as the immersion time increased when the product was prefrozen in a freezer according to the present invention.

Figure 5:
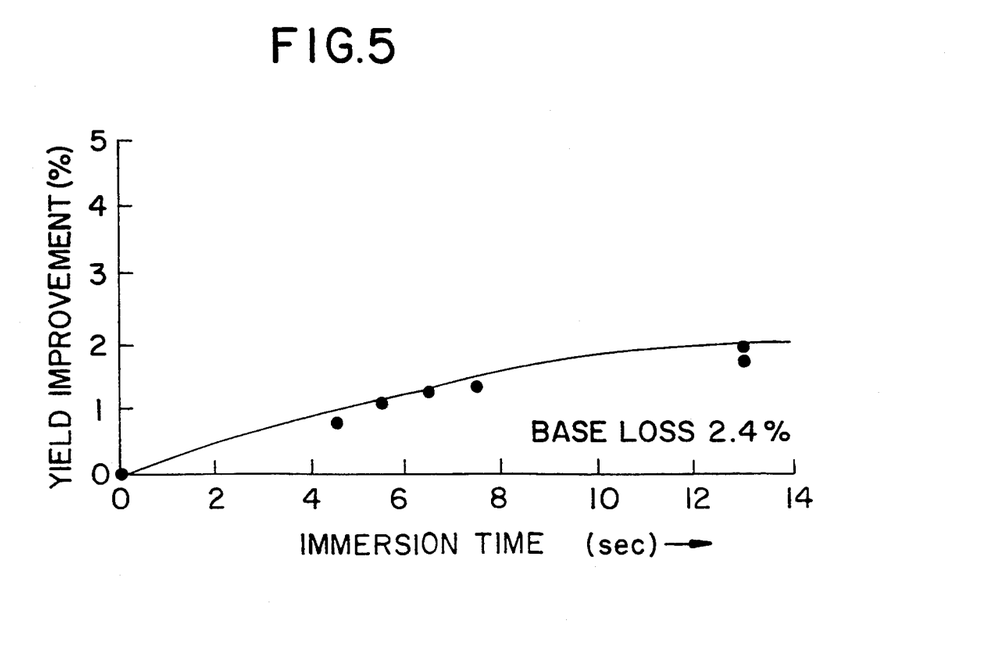
FIG. 5 is a plot of immersion time against yield improvement for raw chicken products processed in accord with the present invention.

FIG. 5 shows an identical plot of yield improvement for raw chicken filets where the base loss was 2.4% and the yield improvement went up approximately 2%.

Figure 6:
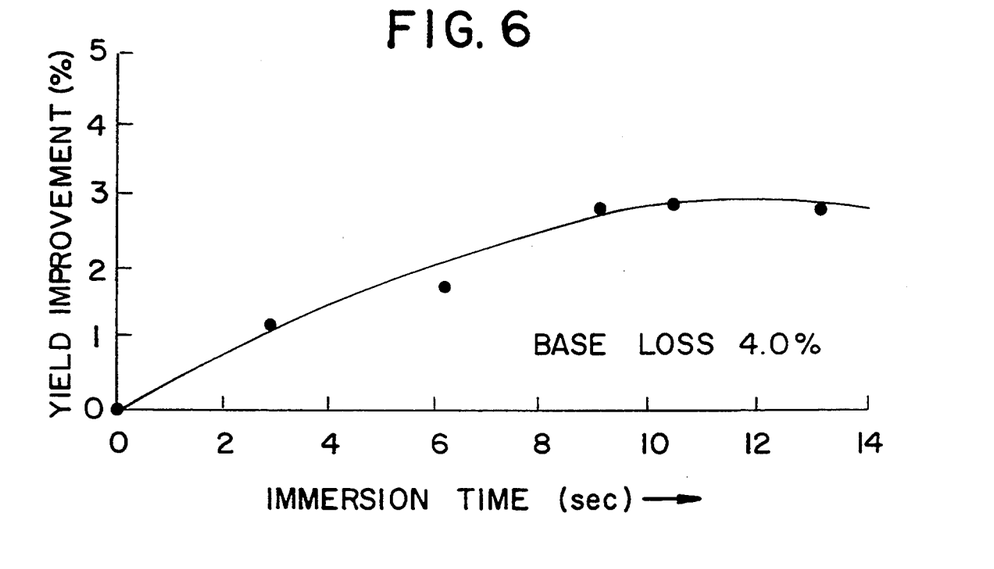
FIG. 6 is a plot of immersion time against yield improvement for hot beef sirloin patties processed according to the present invention.

FIG. 6 shows an identical plot for hot beef sirloin patties where the base loss was 4% and the yield improvement was increased to about 3%.

Figure 7:
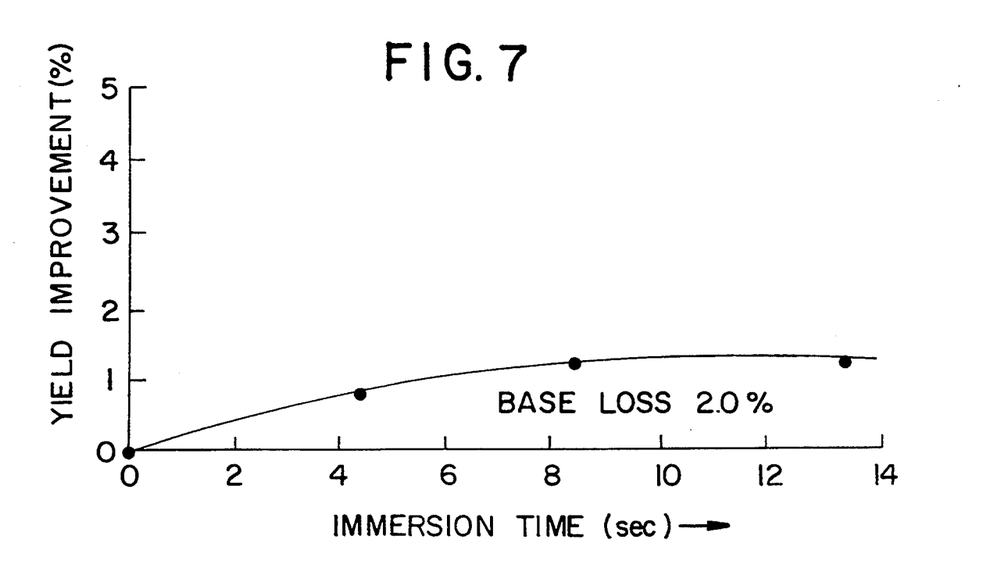
FIG. 7 is a plot of immersion time against yield improvement for hot extended beef patties processed according to the present invention.

A similar plot for hot extended beef patties shows yield improvements of about 1.5% where the base loss was 2% as shown in FIG. 7.

Figure 8:
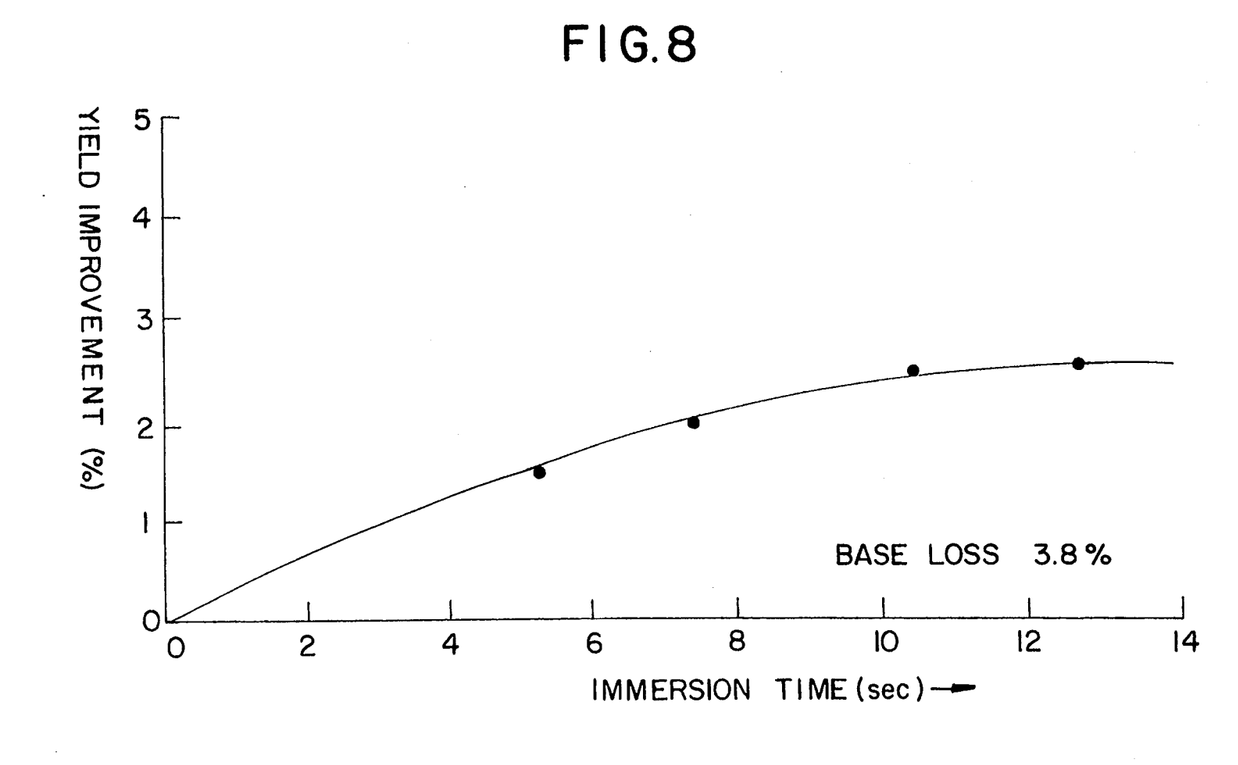
FIG. 8 is a plot of immersion time against yield improvement for hot beef pizza toppings processed according to the present invention.

As shown in FIG. 8, hot beef pizza toppings showing a base loss of 3.8% by weight, showed yield improvements of over 2% when the apparatus of the present invention was used in combination with a mechanical freezing device.

Thus, according to the present invention, the immersion unit with a shallow immersion bath and a top spray can adequately freeze or crust freeze the entire product surface. As stated above, this is accomplished by three distinct heat transfer sections. The gas flow aerodynamics creates these sections as the contour of the immersion pan forces gas flow out the entrance and exit ends of the pan. The three distinct sections are: (1) counterflow gas convection exchange at the entry end 12 of the freezer 10; (2) immersion/impingement spray in the middle portion of the freezer 10; and (3) co- or parallel flow gas convection exchange at the discharge end 14 of the freezer 10. The most important zone is the immersion/impingement zone since the immersing of the product provides excellent bottom side heat transfer while the impingement spray nozzle provides top side heat transfer of the particles moving through the liquid cryogen bath which may be kept to a minimal depth (i.e. bath depth does not have to exceed the height of the product as it enters the freezer 10 on belt 44). Together according to the method and apparatus of the invention the product can be uniformly and rapidly crust frozen. With proper control of the freezer, the particles can be through frozen in the device according to the present invention.

Thus, the method and apparatus of the present invention permits rapid heat transfer over a very short distance and time due to high heat transfer coefficients completely surrounding the product to be frozen.

The gas flow can be controlled via thermocouple feedback of variable speed exhaust fans outside of the freezer 10 (not shown) connected to exhaust ducts 20, 22 which minimizes ingress of room air into the freezer housing and therefore maximizes efficiency by not having to cool air entering or infiltrating into the freezer. Vaporized cryogen is collected inside freezer 10 by means of exhaust plenums 16, 18 inside the freezer 10 as shown in FIG. 1. Using this system permits the operator to collect cold vaporized cryogen with a minimum of entrained room air which can be used in other refrigeration processes.

Having thus described our invention, what is desired to be secured by Letters Patent of the United States is set forth in the appended claims.

We claim:

1. A method for completely crust freezing or through freezing a particle comprising the steps of:
   introducing the particle into an entry end of a bath of liquid cryogen having a normal boiling, point below −300° F.;
   moving said particle through said bath to a discharge end of said bath;
   simultaneously exposing said bath and said particle as it moves through said bath to a spray of liquid cryogen as; and,
   continuing said spray of liquid cryogen to contact portions of said particle above the surface said bath and to maintain the level of said bath, whereby the frozen articles show an improved product yield.

2. A method according to claim 1 wherein said particle is a moiety of a food product.

3. A method according to claim 1 wherein said liquid cryogen is liquid nitrogen.

4. A method according to claim 1 wherein movement of said particle is effected by a continuous conveyor moving through a portion of said bath.

5. A method according to claim 1 wherein said particle is removed from said bath and introduced into a separate freezer for through freezing said particle.

6. A method according to claim 1 wherein vaporized cryogen is collected with a minimum of contamination of ambient environment for reuse.

7. A method according to claim 1 wherein said food product is bouyant and uniform crust freezing is effected by said liquid cryogen spray.

8. In an immersion-type freezer of the type wherein a particle to be frozen is introduced into a bath of a cryogenic liquid contained in an insulted housing with means to move said particle through said bath from an entry end to discharge end in said housing, the improvement comprising:

means disposed in said housing above said bath to spray liquid cryogen on a substantial portion of the surface bath and on said particle during its movement through said bath;

means to pre-cool said particle by vaporizing cryogenic liquid moving in counter-current flow to said particle at said entry end of said housing; and means to post-cool said particle by vaporizing cryogenic liquid many in co-current flow to said particle at said discharge end of said housing; whereby there is and improvement in the product yield of particles frozen in said freezer.

9. An immersion-type freezer according to claim 8 wherein said means is a plurality of individual spray nozzles fed by a manifold connected to a source of cryogenic liquid.

10. An immersion-type freezer according to claim 8 wherein said means to spray liquid cryogen is disposed in said housing so that liquid cryogen is introduced into said bath between said entry end and said discharge end.

11. An immersion-type freezer according to claim 8 wherein said means to move said particles is a conveyor belt, a portion of which is disposed within said liquid cryogen bath.

12. An immersion-type freezer according to claim 8 wherein said cryogenic liquid is liquid nitrogen.

13. An immersion-type freezer according to claim 8 where there is included means to recover vaporized cryogen inside said freezer with minimal entrained ambient atmosphere.

* * * * *

UNITED STATES PATENT AND TRADEMARK OFFICE
CERTIFICATE OF CORRECTION

PATENT NO. : 5,417,074

DATED : May 23, 1995

INVENTOR(S) : McAfee et al.

It is certified that error appears in the above-identified patent and that said Letters Patent is hereby corrected as shown below:

Column 4, Line 53
 After "surface", insert --of--

Signed and Sealed this

Fifteenth Day of August, 1995

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,417,074
DATED : May 23, 1995
INVENTOR(S) : McAfee et al.

It is certified that error appears in the above-identified patent and that said Letters Patent is hereby corrected as shown below:

Column 4, Line 51
    Delete "as"

Column 6, Line 1
    Delete "and" and substitute therefor -- an --

Signed and Sealed this

Tenth Day of October, 1995

Attest:

BRUCE LEHMAN

*Attesting Officer*      *Commissioner of Patents and Trademarks*